United States Patent
Okamoto et al.

(10) Patent No.: US 6,947,775 B2
(45) Date of Patent: Sep. 20, 2005

(54) SYSTEM, METHOD, PROGRAM AND STORAGE MEDIUM FOR SAVING POWER

(75) Inventors: Ryuichi Okamoto, Moriguchi (JP); Hideki Matsushima, Hirakata (JP); Masayuki Kozuka, Arcadia, CA (US); Katsumi Tokuda, Mino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 523 days.

(21) Appl. No.: 10/049,528

(22) PCT Filed: Jun. 15, 2001

(86) PCT No.: PCT/US01/19233

§ 371 (c)(1),
(2), (4) Date: Feb. 13, 2002

(87) PCT Pub. No.: WO01/98879

PCT Pub. Date: Dec. 27, 2001

(65) Prior Publication Data

US 2002/0132653 A1 Sep. 19, 2002

Related U.S. Application Data

(63) Continuation-in-part of application No. 09/598,251, filed on Jun. 21, 2000.

(51) Int. Cl.[7] .............................................. H04M 1/00
(52) U.S. Cl. ................... 455/574; 455/343.5; 455/572; 455/343.1; 455/127.1; 455/127.5
(58) Field of Search ............................ 455/574, 127.5, 455/343.5, 572, 343.1, 127.1, 582, 583, 571, 298, 134

(56) References Cited

U.S. PATENT DOCUMENTS

| | | | |
|---|---|---|---|
| 5,115,182 A | * | 5/1992 | Ehmke et al. ............... 320/136 |
| 5,230,056 A | | 7/1993 | Hoshina |
| 5,410,141 A | * | 4/1995 | Koenck et al. ......... 235/472.02 |
| 5,442,794 A | | 8/1995 | Winsor et al. |
| 5,845,142 A | | 12/1998 | Hayasaka |
| 5,870,685 A | * | 2/1999 | Flynn .......................... 455/573 |
| 5,928,365 A | | 7/1999 | Yoshida |
| 5,944,829 A | | 8/1999 | Shimoda |
| 5,953,646 A | * | 9/1999 | Hirasawa .................. 455/343.2 |
| 6,049,884 A | | 4/2000 | Tsuji |
| 6,052,791 A | | 4/2000 | Chen et al. |
| 6,198,820 B1 | * | 3/2001 | Tetsushi ..................... 379/413 |
| 6,275,715 B1 | * | 8/2001 | Motohashi ................... 455/574 |
| 6,307,480 B1 | * | 10/2001 | Sheldon et al. .......... 340/636.1 |
| 6,408,196 B2 | * | 6/2002 | Sheynblat et al. .......... 455/574 |
| 6,523,125 B1 | * | 2/2003 | Kohno et al. ............... 713/320 |
| 6,546,263 B1 | * | 4/2003 | Petty et al. .................. 455/566 |
| 6,643,527 B2 | * | 11/2003 | Satoh et al. ................. 455/574 |
| 6,704,583 B1 | * | 3/2004 | Yoshioka .................... 455/574 |
| 2003/0087682 A1 | * | 5/2003 | Cathey et al. .............. 455/574 |
| 2004/0147277 A1 | * | 7/2004 | Kaewell et al. ............. 455/522 |

FOREIGN PATENT DOCUMENTS

JP         11-184576          7/1999

* cited by examiner

*Primary Examiner*—Sonny Trinh
*Assistant Examiner*—Huy Phan
(74) *Attorney, Agent, or Firm*—Wenderoth, Lind & Ponack, L.L.P.

(57) ABSTRACT

The invention relates to power saving in portable terminals (100) with recording media (200). Conventionally, there is the problem that a battery (104) in the portable terminal (100) may become exhausted and as a result the original function of the terminal cannot be performed. To solve this problem, when the remaining battery capacity is low, the invention controls power supply (108) to the recording media (200) and clock supply (110) to a CPU (202) in the recording media (200) so as to reduce power supplied to the recording media (200)

10 Claims, 4 Drawing Sheets

FIG. 3

| REMAINING BATTERY LEVEL | POWER SUPPLY | CLOCK FREQUENCY |
|---|---|---|
| 4 | NORMAL | NORMAL |
| 3 | NORMAL | LOW |
| 2 | NORMAL | STOPPED |
| 1 | STOPPED | STOPPED |

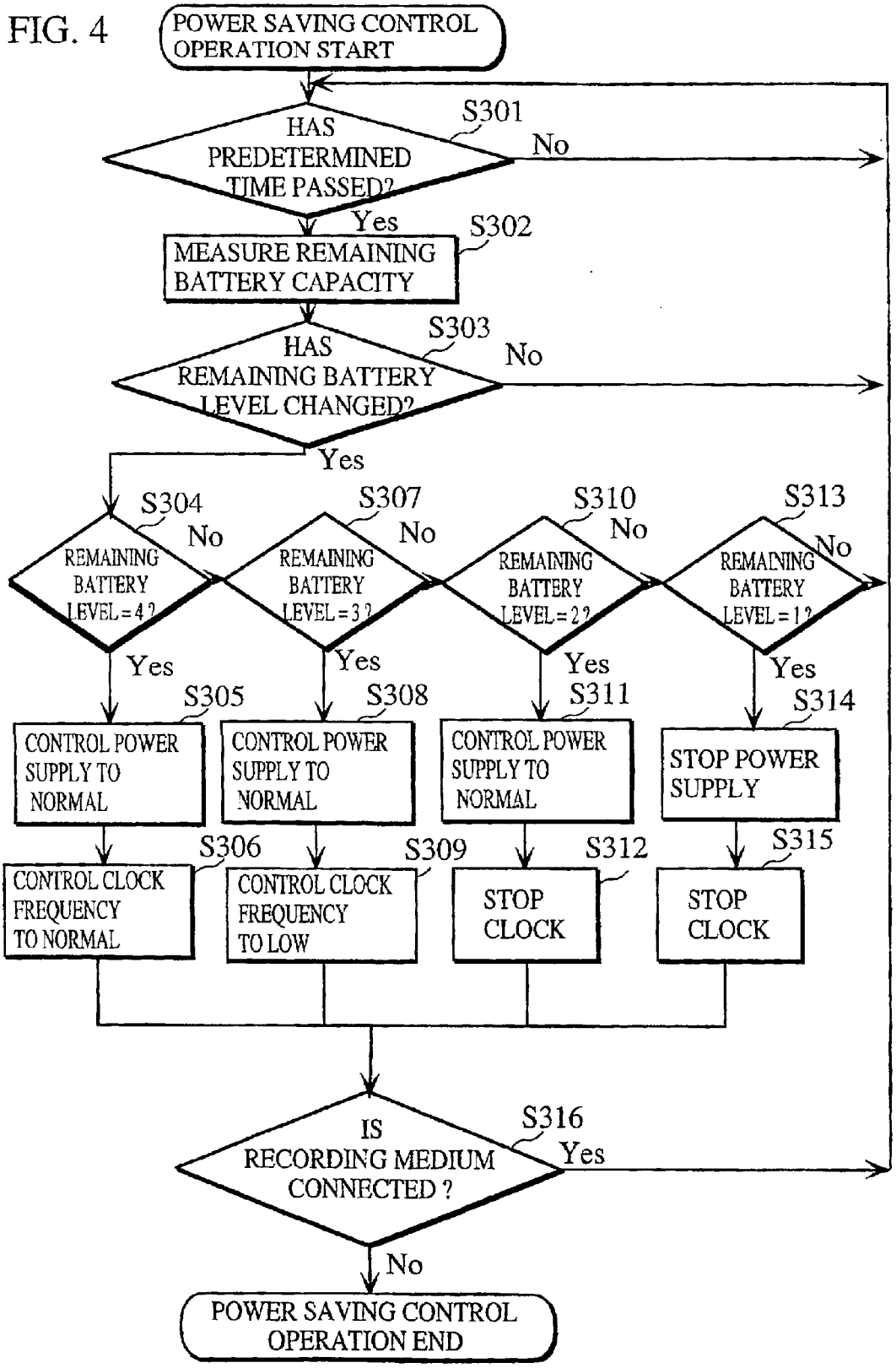

SYSTEM, METHOD, PROGRAM AND STORAGE MEDIUM FOR SAVING POWER

This application is a continuation-in-part under 35 U.S.C. § 120 of U.S. application Ser. No. 09/598,251 filed Jun. 21, 2000 now U.S. Pat. No. 6,799,279 which is incorporated herein by reference.

TECHNICAL FIELD

The present invention relates to power saving techniques for portable terminals equipped with recording media.

BACKGROUND ART

With recent improvements in semiconductor technology, recording media such as SD memory cards have shrunk in size and grown in capacity. As a result, recording media are increasingly equipped in portable terminals such as mobile phones and PDAs and put to use. In other words, portable terminals that are equipped with recording media which store content such as image and music data, and that realize an additional function of content reproduction as well as their original function of communication and the like, are becoming widely available.

To execute such an additional function in a portable terminal equipped with a recording medium, the recording medium needs to be operated. This requires a large amount of power to be supplied from a battery in the portable terminal to the recording medium.

However, when the remaining capacity of the battery is low, if the execution of the additional function is continued, the battery in the portable terminal may become exhausted. When this happens, the portable terminal cannot perform its original function.

DISCLOSURE OF INVENTION

The present invention was conceived in view of the problem with the background art, and has an object of providing a portable terminal that can prevent its original function as a portable terminal from becoming unable to be performed as a result of performing an additional function associated with an operation of a recording medium, when a remaining battery capacity is low.

The stated object can be achieved by a portable terminal including a battery for supplying power to parts of the portable terminal and to a recording medium equipped in the portable terminal, the portable terminal including: a remaining battery capacity monitoring unit operable to monitor a remaining capacity of the battery; and a power controlling unit operable to exercise control so that the power supplied to the recording medium is reduced, when the remaining capacity is below a predetermined level.

With this construction, if the remaining battery capacity is below the predetermined level, the amount of power consumed by the recording medium is reduced. Accordingly, in a portable terminal that performs only its original function when a recording medium is not equipped but that can also perform an additional function when the recording medium is equipped and operated, it is possible to prevent the portable terminal from becoming unable to perform its original function as a result of continuously performing the additional function, when a remaining battery capacity is low.

Here, the control exercised by the power controlling unit may be to stop the power supply to the recording medium when the remaining capacity is below the predetermined level.

With this construction, if the remaining battery capacity is below the predetermined level, the power supply to the recording medium is cut off. This disables the execution of the additional function, and allows the portable terminal to perform only its original function.

Here, the recording medium may include a CPU, wherein the control exercised by the power controlling unit is to stop a supply of a clock to the CPU in the recording medium when the remaining capacity is below the predetermined level.

With this construction, if the remaining battery capacity is below the predetermined level, the CPU in the recording medium does not operate. This reduces the power consumption associated with the execution of the additional function, and allows the portable terminal to perform its original function with priority.

Here, the recording medium may include a CPU, wherein the control exercised by the power controlling unit is to decrease a frequency of a clock supplied to the CPU in the recording medium when the remaining capacity is below the predetermined level.

With this construction, if the remaining battery capacity is below the predetermined level, the clock frequency for the CPU in the recording medium is decreased. This reduces the power consumption associated with the execution of the additional function, and allows the portable terminal to perform its original function with a higher priority while also performing the additional function.

Here, the portable terminal may further include a setting unit operable to set the predetermined level in accordance with a user operation, and hold the predetermined level.

With this construction, each individual user can set the remaining battery threshold level for reducing the power supplied to the recording medium. This enables control that depends on what relative importance each individual user attaches to the original function and the additional function.

Here, the recording medium may include a CPU, wherein the control exercised by the power controlling unit is to (a) stop the power supply to the recording medium, when the remaining capacity is not less than a first level but below a second level, (b) stop a supply of a clock to the CPU in the recording medium, when the remaining capacity is not less than the second level but below a third level, and (c) decrease a frequency of the clock supplied to the CPU in the recording medium, when the remaining capacity is not less than the third level but below a fourth level.

With this construction, control can be exercised so as to gradually reduce the power consumption of the recording medium in accordance with the remaining battery capacity.

The stated object can also be achieved by a portable terminal that has a communication function and a content reproduction function, and includes a battery for supplying power to parts of the portable terminal and to a recording medium which stores content and is equipped in the portable terminal, the portable terminal including: a remaining battery capacity monitoring unit operable to monitor a remaining capacity of the battery; and a power controlling unit operable to exercise control so that the power supplied to the recording medium is reduced, when the remaining capacity is below a predetermined level.

With this construction, if the remaining battery capacity is below the predetermined level in the portable terminal whose original function is the communication function, the power consumption of the recording medium is reduced. This prevents the portable terminal from becoming unable to perform the communication function as a result of continuously performing the content reproduction function.

BRIEF DESCRIPTION OF DRAWINGS

FIG. 3 shows the relation between remaining battery capacity and power control.

FIG. 4 is a flowchart showing a power saving control operation of the portable terminal.

BEST MODE FOR CARRYING OUT THE INVENTION

Figure 1:
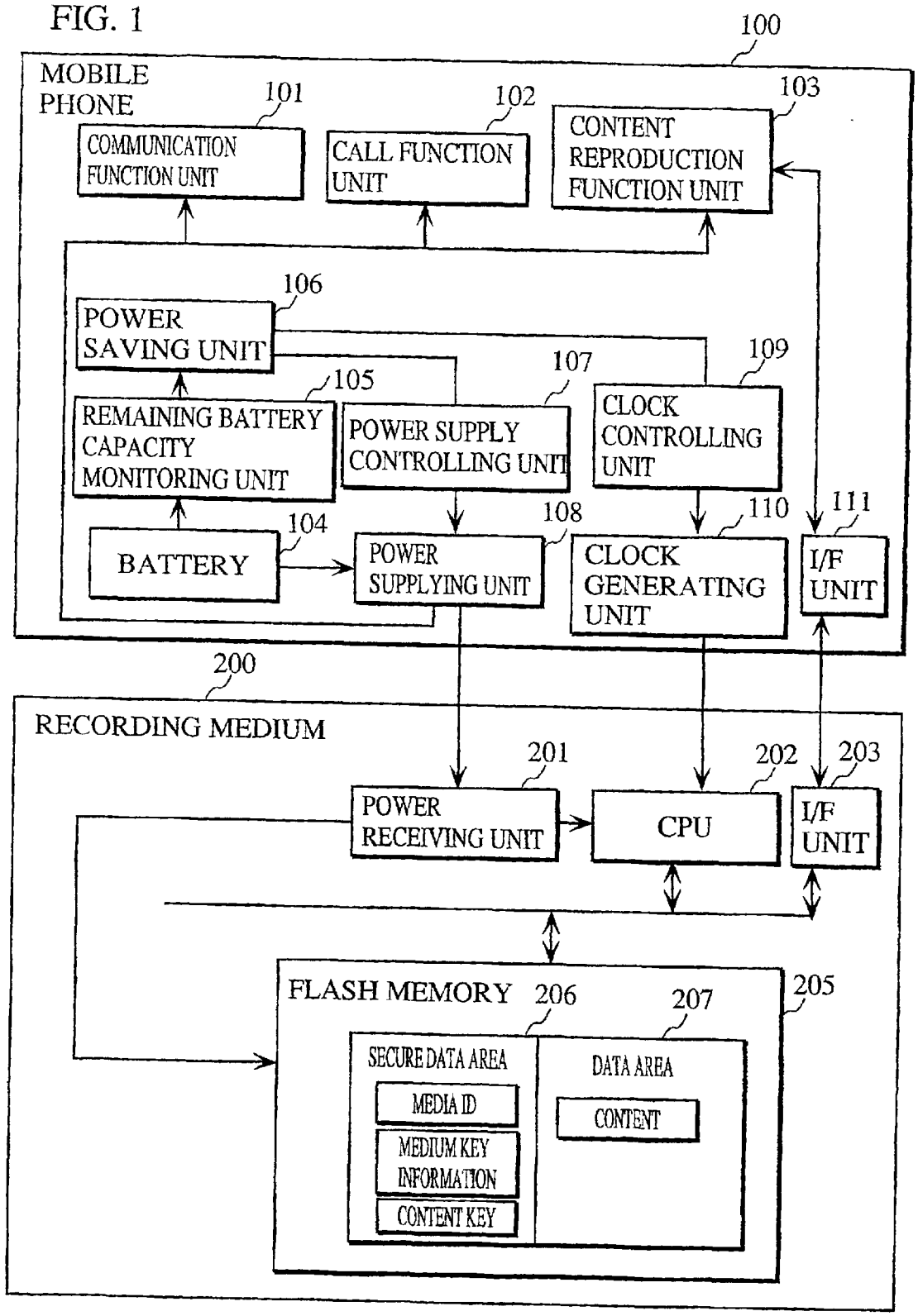
FIG. 1 shows a construction of a portable terminal according to an embodiment of the invention, and a construction of a recording medium connected to the portable terminal.

The following describes an embodiment of the present invention by referring to the drawings.

(Construction of a Portable Terminal)

FIG. 1 shows a construction of a mobile phone to which the embodiment of the invention relates, and a construction of a recording medium that is connected to the mobile phone. A mobile phone 100 has an original function as a telephone, and an additional function of reproducing content recorded on a recording medium 200. The mobile phone 100 includes a communication function unit 101, a call function unit 102, a content reproduction function unit 103, a battery 104, a remaining battery capacity monitoring unit 105, a power saving unit 106, a power supply controlling unit 107, a power supplying unit 108, a clock controlling unit 109, a clock generating unit 110, and an I/F unit 111.

The communication function unit 101 performs signal processing, modulation/demodulation, and the like, for transmitting and receiving voice.

The call function unit 102 inputs/outputs the voice, and is made up of a microphone and a speaker.

The communication function unit 101 and the call function unit 102 realize the original function as a mobile phone.

Figure 2:
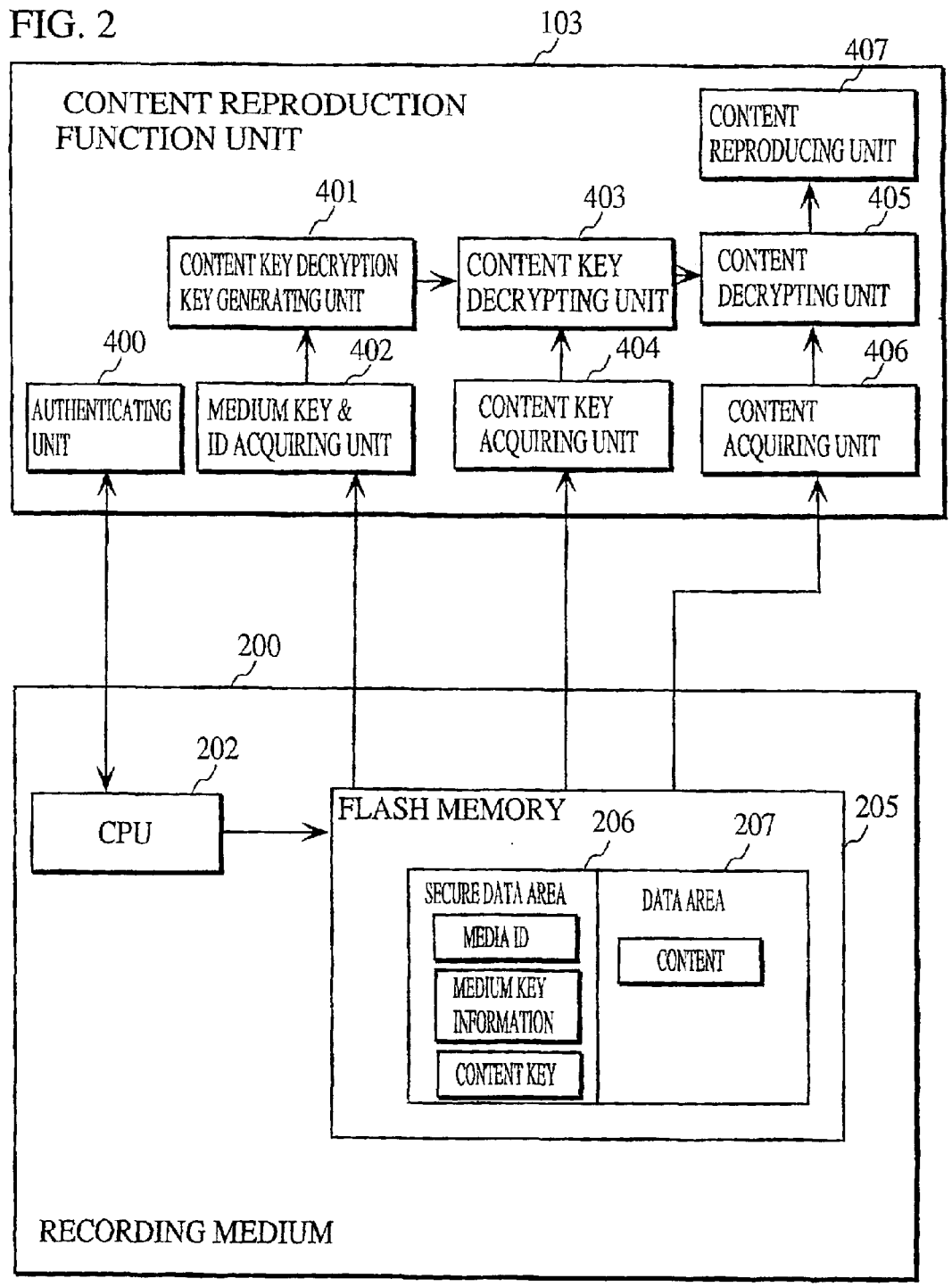
FIG. 2 shows a detailed construction of a content reproduction function unit shown in FIG. 1.

The content reproduction function unit 103 realizes the additional function of the mobile phone 100, and performs reproduction of content recorded on the recording medium 200 and necessary processes for the reproduction. FIG. 2 shows a detailed construction of the content reproduction function unit 103. The details of the content reproduction function unit 103 are explained below, with reference to the drawing.

An authenticating unit 400 performs authentication with a CPU 202 in the recording medium 200. If the authentication is successful, the CPU 202 permits the mobile phone 100 to access a secure data area 206 in a flash memory 205. A medium key & ID acquiring unit 402 reads a media ID and medium key information from the secure data area 206. A content key decryption key generating unit 401 generates a content key decryption key from the read media ID and medium key information. A content key acquiring unit 404 reads a content key from the secure data area 206. A content key decrypting unit 403 decrypts the read content key using the generated content key decryption key. A content acquiring unit 406 reads content from a data area 207 in the flash memory 205. A content decrypting unit 405 decrypts the read content using the decrypted content key. A content reproducing unit 407 reproduces the decrypted content.

The battery 104 holds power for operating the mobile phone 100 and the recording medium 200.

The remaining battery capacity monitoring unit 105 measures a voltage of the battery 104 at predetermined time intervals, to monitor the remaining capacity of the battery 104.

The power saving unit 106 controls power consumption of the recording medium 200, by instructing the power supply controlling unit 107 and the clock controlling unit 109 in accordance with the level of the remaining battery capacity.

FIG. 3 shows the relation between the remaining battery level and the power control. As illustrated, when the remaining battery level is "4" (6 to 8 minutes when converted to time during which the mobile phone 100 performs its original function only), the power supply is normal, and the clock frequency is normal. When the remaining battery level is "3" (4 to 6 minutes), the power supply is normal, and the clock frequency is low. When the remaining battery level is "2" (2 to 4 minutes), the power supply is normal, and the clock is stopped. When the remaining battery level is "1" (less than 2 minutes), both the power supply and the clock are stopped.

The power supplying unit 108 takes power from the battery 104, and supplies it to the mobile phone 100 and the recording medium 200.

The power supply controlling unit 107 controls the power supply of the power supplying unit 108 to the recording medium 200, according to instructions from the power saving unit 106.

The clock generating unit 110 generates a clock and supplies it to the CPU 202 in the recording medium 200.

The clock controlling unit 109 controls the clock generation of the clock generating unit 110, according to instructions from the power saving unit 106.

The I/F unit 111 exchanges data with the recording medium 200.

The recording medium 200 includes a power receiving unit 201, the CPU 202, an I/F unit 203, and the flash memory 205.

The power receiving unit 201 receives power and supplies it to each construction element in the recording medium 200.

The CPU 202 performs authentication with the mobile phone 100, control of reading/writing data, and the like.

The I/F unit 203 exchanges data with the mobile phone 100.

The flash memory 205 has the secure data area 206 and the data area 207.

The secure data area 206 is an area which can be accessed by the mobile phone 100 only when the authentication is successful. The secure data area 206 stores the media ID, the medium key information, and the content key.

The media ID is a number uniquely given to the recording medium 200 for identifying the recording medium 200. The media ID is stored in the recording medium 200 at the time of manufacturing.

The medium key information is used to generate the content key decryption key, together with the media ID.

The content key is a key for decrypting the content, and is stored having been encrypted by a secret key cipher. To decrypt the content key, the content key decryption key is used.

The data area 207 is an area which can be accessed by the mobile phone 100 without performing the mutual authentication. The data area 207 stores the content which has been encrypted by a secret key cipher. Here, the content is MP3 music data.

(Operation)

An operation of the mobile phone 100 is explained below.

FIG. 4 is a flowchart showing a power saving control operation of the mobile phone 100.

The power saving control operation starts when the recording medium 200 is connected to the mobile phone 100.

First, the remaining battery capacity monitoring unit 105 measures the remaining capacity of the battery 104 at predetermined time intervals (S301 and S302).

The power saving unit 106 checks whether the level of the remaining battery capacity has changed (S303). If the remaining battery level has not changed, the operation returns to step S301. Otherwise, the operation proceeds to the next step.

When the remaining battery level is "4", the power saving unit 106 instructs the power supply controlling unit 107 to control the power supply of the power supplying unit 108 to the recording medium 200 to be normal. The power supply controlling unit 107 accordingly controls the power supplying unit 108 to switch to the normal power supply, if the power supply of the power supplying unit 108 is not normal (S304 and S305).

Also, the power saving unit 106 instructs the clock controlling unit 109 to control the clock frequency of the clock generating unit 110 to be normal. The clock controlling unit 109 accordingly controls the clock generating unit 110 to switch to the normal clock frequency, if the clock frequency of the clock generating unit 110 is not normal (S306).

When the remaining battery level is "3", the power saving unit 106 instructs the power supply controlling unit 107 to control the power supply of the power supplying unit 108 to be normal. The power supply controlling unit 107 accordingly controls the power supplying unit 108 to switch to the normal power supply, if the power supply of the power supplying unit 108 is not normal (S307 and S308).

Also, the power saving unit 106 instructs the clock controlling unit 109 to control the clock frequency of the clock generating unit 110 to be low. The clock controlling unit 109 accordingly controls the clock generating unit 110 to switch to the low clock frequency, if the clock frequency of the clock generating unit 110 is not low (S309).

When the remaining battery level is "2", the power saving unit 106 instructs the power supply controlling unit 107 to control the power supply of the power supplying unit 108 to be normal. The power supply controlling unit 107 accordingly controls the power supplying unit 108 to switch to the normal power supply, if the power supply of the power supplying unit 108 is not normal (S310 and S311).

Also, the power saving unit 106 instructs the clock controlling unit 109 to stop the clock generation of the clock generating unit 110. The clock controlling unit 109 accordingly controls the clock generating unit 110 to stop the clock generation, if the clock generation of the clock generating unit 110 is not stopped (S312).

When the remaining battery level is "1", the power saving unit 106 instructs the power supply controlling unit 107 to stop the power supply of the power supplying unit 108. The power supply controlling unit 107 accordingly controls the power supplying unit 108 to stop the power supply, if the power supply of the power supplying unit 108 is not stopped (S313 and S314).

Also, the power saving unit 106 instructs the clock controlling unit 109 to stop the clock generation of the clock generating unit 110. The clock controlling unit 109 accordingly controls the clock generating unit 110 to stop the clock generation, if the clock generation of the clock generating unit 110 is not stopped (S315).

If the recording medium 200 is removed from the mobile phone 100, the power saving control operation ends. Otherwise, the operation returns to step S301 to repeat the power saving control (S316).

(Conclusion)

As described above, the mobile phone according to the above embodiment reduces the power supplied to the recording medium when the remaining battery capacity is low, with is being possible to prevent the original function of the mobile phone from becoming unable to be performed.

(Modifications)

(1) Regarding the Recording Medium

The recording medium of the above embodiment may be a memory card such as a compact flash card, a smart card, a memory stick, a multimedia card, or an SD memory card.

Also, the recording medium may be a card that does not include a CPU, with the portable terminal controlling only the power supply to the recording medium.

(2) Regarding the Content

The above embodiment describes the case where the content is MP3 electronic music data, but the invention is not limited to such. For example, the content may be electronic music data of AAC (Advanced Audio Coding), LPCM (Linear Pulse Code Modulation), or similar. Also, the content may be video data of JPEG (Joint Photographic Expert Group), MPEG 1/2/4, or the like. Further, the content may be electronic text data of HTML (Hyper Text Markup Language) or the like, or an application such as a game.

(3) Regarding the Portable Terminal

The above embodiment takes a mobile phone as an example portable terminal, though this is not a limit for the invention, which may be applied to any portable-type terminal, such as a PDA, a hand-held PC, or a notebook-sized PC, that supplies power to itself and to a recording medium equipped therein using a battery.

(4) Regarding the Notification in the Power Saving Procedure

Though the user is not notified of the power saving result in the above embodiment, a message like the one indicating that the content cannot be reproduced because of a low remaining battery capacity may be displayed.

(5) Regarding the Setting of the Remaining Battery Levels

The above embodiment describes the case where the remaining battery levels for switching to the power saving control are predetermined, but such levels may be set by the user.

(6) Regarding the Authentication

The above embodiment describes the case where the CPU 202 in the recording medium 200 performs the authentication with the authenticating unit 400 in the mobile phone 100, but the invention should not be limited to such. For instance, a special chip for authentication may be equipped in the recording medium so as to perform the authentication.

INDUSTRIAL APPLICABILITY

The portable terminal of the present invention can be used as a mobile phone that has a function of reproducing content recorded on a recording medium.

What is claimed is:

1. A portable terminal comprising:
    a remaining battery capacity monitoring unit operable to monitor a remaining capacity of a battery; and
    a power controlling unit operable to stop a power supply from the battery to a recording medium when the remaining capacity is not less than a first level but is below a second level, and to stop a supply of a clock to a CPU included in the recording medium when the remaining capacity is not less than the second level but is below a third level.

2. The portable terminal of claim 1, wherein said power controlling unit is further operable to decrease a frequency of the clock supplied to the CPU in the recording medium, when the remaining capacity is not less than the third level but is below a fourth level.

3. A portable terminal comprising:
- a recording medium having a CPU;
- a remaining battery capacity monitoring unit;
- a power controlling unit; and
- a battery operable to supply power to said recording medium, said remaining battery capacity monitoring unit and said power controlling unit,
- wherein said remaining battery capacity monitoring unit is operable to monitor a remaining capacity of said battery, and
- wherein said power controlling unit is operable to stop power supply to said recording medium when the remaining battery capacity is not less than a first level but is below a second level, and to stop a supply of a clock to said CPU when the remaining battery capacity is not less than the second level but is below a third level.

4. The portable terminal of claim 3, wherein said power controlling unit is further operable to decrease a frequency of the clock supplied to said CPU in said recording medium, when the remaining capacity is not less than the third level but is below a fourth level.

5. A power control method for use in a portable terminal that includes a battery for supplying power to parts of the portable terminal and to a recording medium equipped in the portable terminal, said power control method comprising:
- monitoring a remaining capacity of the battery; and
- controlling power by stopping the power supply to the recording medium when the remaining capacity is not less than a first level but is below a second level, and stopping a supply of a clock to a CPU included in the recording medium when the remaining capacity is not less than the second level but is below a third level.

6. The power control method of claim 5, wherein said controlling power comprises decreasing a frequency of the clock supplied to the CPU in the recording medium, when the remaining capacity is not less than the third level but is below a fourth level.

7. A computer-readable storage medium storing a computer program for executing a power control operation on a computer which includes a battery for supplying power to parts of the computer and to a recording medium equipped in the computer, the computer program comprising computer-readable instructions operable to instruct the computer to perform a method comprising:
- monitoring a remaining capacity of the battery; and
- controlling power by stopping the power supply to the recording medium when the remaining capacity is not less than a first level but is below a second level, and stopping a supply of a clock to a CPU included in the recording medium when the remaining capacity is not less than the second level but is below a third level.

8. The computer-readable storage medium of claim 7, wherein the computer-readable instructions are operable to instruct the computer to perform said controlling power by decreasing a frequency of the clock supplied to the CPU in the recording medium, when the remaining capacity is not less than the third level but is below a fourth level.

9. A computer program for executing a power control operation on a computer which includes a battery for supplying power to parts of the computer and to a recording medium equipped in the computer, said computer program comprising computer-readable instructions operable to instruct the computer to perform a method comprising:
- monitoring a remaining capacity of the battery; and
- controlling power by stopping the power supply to the recording medium when the remaining capacity is not less than a first level but is below a second level, and stopping a supply of a clock to a CPU included in the recording medium when the remaining capacity is not less than the second level but is below a third level.

10. The computer program of claim 9, wherein the computer-readable instructions are operable to instruct the computer to perform said controlling power by further decreasing a frequency of the clock supplied to the CPU in the recording medium, when the remaining capacity is not less than the third level but is below a fourth level.

* * * * *